C. H. STOCKING.
HOG FEEDER.
APPLICATION FILED OCT. 5, 1914.
1,154,073.
Patented Sept. 21, 1915.
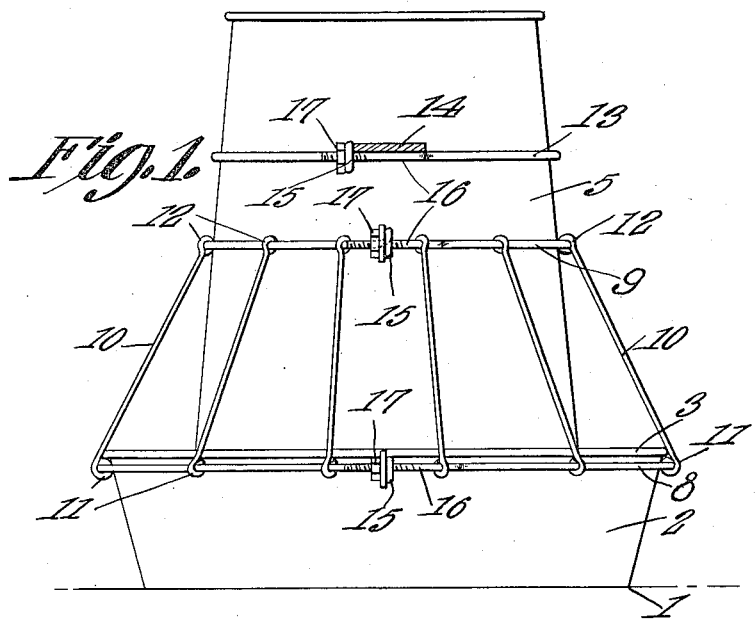
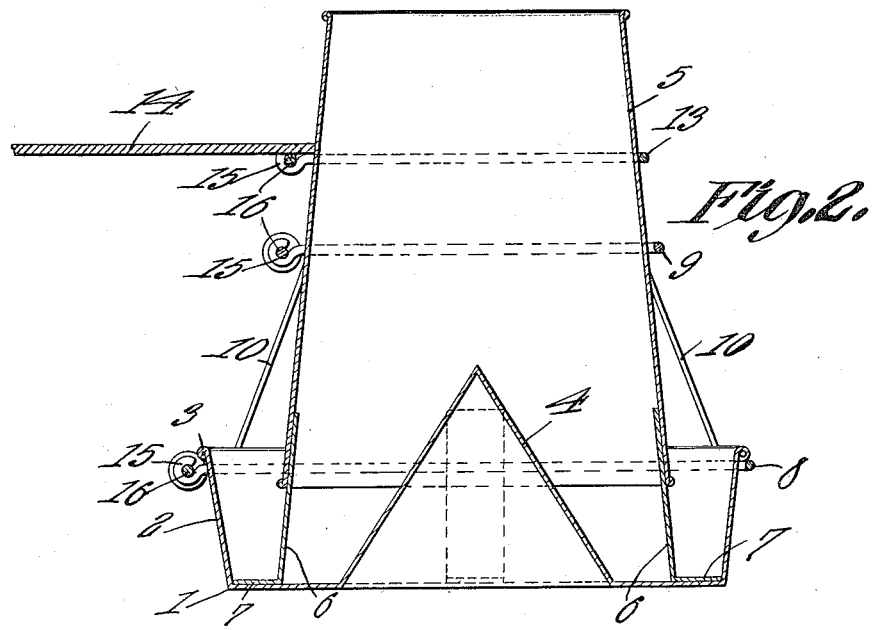
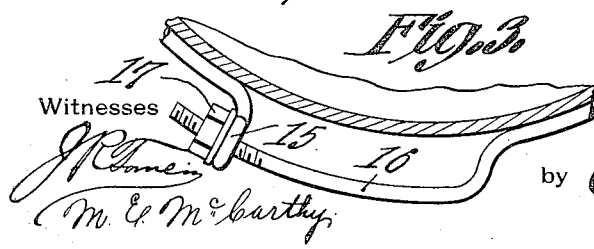
C. H. Stocking, Inventor

UNITED STATES PATENT OFFICE.

CHARLES H. STOCKING, OF AUDUBON, IOWA.

HOG-FEEDER.

1,154,073. Specification of Letters Patent. Patented Sept. 21, 1915.

Application filed October 5, 1914. Serial No. 865,179.

*To all whom it may concern:*

Be it known that I, CHARLES H. STOCKING, a citizen of the United States, residing at Audubon, in the county of Audubon and State of Iowa, have invented a new and useful Hog-Feeder, of which the following is a specification.

The present invention appertains to a hog or stock feeder, and aims to provide a novel and improved device of that character.

The invention contemplates the provision of an annular feeding trough, and means for supplying various sorts of feed thereto from a central bin, in combination with novel means for dividing the trough, in order that the trough may accommodate various numbers and sizes of animals.

It is also within the scope of the invention, to provide a hog feeder of comparatively simple and inexpensive construction, which is of practical and effective service for the intended purposes.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein:—

Figure 1 is a side elevation of the improved feeder. Fig. 2 is a vertical section thereof, the line of view being at right angles to the line of view of Fig. 1. Fig. 3 is an enlarged fragmental detail, illustrating the adjustable connection for the ends of the rings or hoops.

In carrying out the present invention, there is provided a circular pan 1, having the flared or inclined rim 2, provided with the marginal bead 3. The bottom of the pan 1 is provided with a central upstanding cone 4, which forms with the periphery or rim 2 of the pan, an annular feeding trough.

Disposed above the pan 1, is a bin 5 of circular contour, and tapered from its lower to its upper end. The lower end of the bin 5 is disposed within the annular trough, or between the rim 2 of the pan and the cone 4. The lower end of the bin 5 is supported above the bottom of the pan 1, by means of strips 6 secured interiorly to the lower end portion of the bin 5, and forming legs seating upon the bottom of the pan 1 and having outturned feet 7 extending to the rim 2.

The means for dividing the trough so as to accommodate various numbers and sizes of animals, embodies rings 8 and 9 embracing the rim 2 of the pan 1, and the central portion of the bin 5 above the pan, and inwardly inclined dividing rods 10 having eyes 11 at their lower ends embracing the lower ring 8, and having the eyes 12 at their upper ends embracing the upper ring 9. The rods 10 are inclined from the rim 2 of the pan 1 to the outside of the bin 5, and the rods 10 may be set at various positions about the rings 8 and 9, to divide the trough up into the sections desired, in order that the trough may accommodate various sizes and numbers of animals in a most convenient manner. The lower ring 8 embracing the rim 2 of the pan below the bead 3, and the eyes 11 of the rods 10 engaging under the bead 3, will anchor the lower ends of the rods 10 to the pan in an effective manner, while the ring 9 in fitting upon the tapered bin 5, will be held against downward movement, so that the rods 10 and rings 8 and 9 will serve to hold the pan 1 and bin 5 together. Another ring or hoop 13 is mounted upon the bin 5 above the ring or hoop 9, for supporting the inner end of a plank or foot board 14, upon which a person may walk so as to discharge the feed into the upper end of the bin 5, and at the same time to avoid contact with the animals. Each of the rings or hoops 8, 9 and 13 is adjustable, and to this end, one end of each ring is provided with an angularly extending eye 15, while the other end is offset outwardly, as at 16 (reference being had to Fig. 3), the offset end portion 16 extending through the eye 15 and bearing a nut 17 seating against the eye 15. Thus, by adjusting the nut 17, the ring may be contracted, or permitted to expand, as desired. The offset portion 16 of the ring 13 forms the support for the inner end of the plank or foot board 14.

In use, when the feed is discharged into the upper end of the bin 5, the same will gravitate within the bin into the pan or annular trough, the feed being directed toward the rim of the pan, by the cone 4, in order that when the feed is removed from the pan, a fresh supply of feed will be directed outwardly under the lower end of the bin 5, by the cone 4, until the supply of feed within the bin is exhausted. The rods 10 serve to separate or divide the animals, to prevent interference while eating, it being noted that when the rings 8 and 9 are loosened or expanded, the rods 10 may be readily adjusted or slid along the said rings to various positions, so that when the rings 8 and 9 are retightened, the rods will be held in place. Thus, the rods 10 may be adjusted to accommodate various sizes and species of animals in a most desirable manner.

Having thus described the invention, what is claimed as new is:—

1. An animal feeder embodying an annular trough, a circular bin having its lower end entering the trough and supported therein, inclined dividing rods between the rim of the trough and the sides of the bin, and means for adjustably supporting the said rods in order that they may be slid around the trough.

2. An animal feeder embodying a pan, a circular bin supported therein and upstanding therefrom, rings mounted upon the rim of the pan and the bin, and rods having their terminals slidably engaging the said rings.

3. An animal feeder embodying a pan, a circular bin supported therein and upstanding therefrom, expansible rings mounted upon the rim of the pan and the bin, and inclined rods having terminal eyes slidably engaging the said rings.

4. An animal feeder embodying a pan having an inclined rim, an upwardly tapered bin supported above the bottom of the pan, rings embracing the rim of the pan and the bin, and inclined rods having terminal eyes slidably engaging the said rings.

In testimony that I claim the foregoing as my own, I have hereto affixed my signature in the presence of two witnesses.

CHARLES H. STOCKING.

Witnesses:
J. M. FULTON,
G. C. NORTHUP.